(12) United States Patent
Devolites (10) Patent No.: US 7,702,781 B2
(45) Date of Patent: Apr. 20, 2010

(54) SYSTEM AND METHOD OF STORING DATA FILES AT A REMOTE STORAGE FACILITY

(75) Inventor: John A. Devolites, Oakton, VA (US)

(73) Assignee: TEOCO Corporation, Fairfax, VA (US)

( * ) Notice: Subject to any disclaimer, the term of this patent is extended or adjusted under 35 U.S.C. 154(b) by 424 days.

(21) Appl. No.: 11/367,038

(22) Filed: Mar. 3, 2006

(65) Prior Publication Data

US 2007/0208826 A1  Sep. 6, 2007

(51) Int. Cl.
   *G06F 15/16* (2006.01)
   *G06F 15/173* (2006.01)
   *G06F 3/00* (2006.01)

(52) U.S. Cl. .............. 709/224; 709/233; 715/741; 715/748

(58) Field of Classification Search ............ 709/219; 715/248, 769
   See application file for complete search history.

(56) References Cited

U.S. PATENT DOCUMENTS 5,901,228 A    5/1999  Crawford
7,065,586 B2 * 6/2006  Ruttenberg et al. ......... 709/244

2002/0194316 A1* 12/2002 Gous et al. .................. 709/221
2002/0198963 A1* 12/2002 Wu et al. ..................... 709/219
2003/0011681 A1   1/2003 Ohmura
2004/0174562 A1   9/2004 Edwards
2005/0125513 A1   6/2005 Lam et al.
2006/0031770 A1*  2/2006 McMenamin ............... 715/741

OTHER PUBLICATIONS

Neil J. Rubenking, "AIM Accounts Gain Free E-mail," PC Magazine, www.pcmag.com, article date: Jun. 6, 2005.
Author Unknown, "Introduction to 90 Online File Storage Services," http://www.lifehack.org/articles/lifehack/introduction-to-90-online-file-storage-services.html, Aug. 14, 2006.

* cited by examiner

*Primary Examiner*—Rupal D Dharia
*Assistant Examiner*—Xiang Yu
(74) *Attorney, Agent, or Firm*—Venable LLP; Ralph P. Albrecht; Christopher Ma (57) ABSTRACT

A system may include a network, a remote storage facility coupled to the network, and a client coupled to the network. The client may be adapted to receive a store command for a data file, to prompt a user for a file name for the data file, and to receive a parameter selection. The parameter selection may include a transfer time. The client may be adapted to apply the parameter selection to the data file, to queue the data file in a queue for transmission to the remote storage facility, and to transfer the data file to the remote storage facility at the transfer time.

38 Claims, 5 Drawing Sheets

SYSTEM AND METHOD OF STORING DATA FILES AT A REMOTE STORAGE FACILITY

BACKGROUND OF THE INVENTION

1. Field of the Invention

The invention generally relates to a system for remotely storing data files, and more particularly to a system for transferring data files from a client across a network to a remote storage facility.

2. Related Art

Losing data is a significant problem for computer systems and electronic devices, and for users of computer systems and electronic devices. Sophistication of computer users varies greatly and may sometimes add to the loss of data. Conventional methods of storing data may store the data locally on a hard drive or a flash memory of a computing device. However, computing devices are vulnerable to viruses, instability in operating systems, storage device failures, and damage to the computer system, all of which may lead to a loss of data and to user frustration. The frustration is particularly acute when data of importance is lost, such as work-related data or digital photograph data having sentimental value. While improvements in computer hard drive and other storage device technologies, such as redundant array of inexpensive disks (RAID) and mirroring, may allow some opportunity for data recovery, many times data may be lost forever. Data may be lost in many instances since conventional computer systems rely on the integrity of data stored at a storage device local to their computing device.

What is needed then is an improved storage system and method of protecting data that overcomes shortcomings of conventional offerings.

SUMMARY OF THE INVENTION

Exemplary embodiments of the invention may include a system, a method, and a computer accessible media for protecting computer data.

A method according to an exemplary embodiment of the invention may include receiving, at a client, a selection by a user of a store command at a graphical user interface (GUI) selecting a data file for transfer across a network for storage at a remote storage facility, prompting the user for a file name for the data file at the GUI, associating the file name with the data file, receiving a parameter selection that may include a transfer time at the GUI, applying the parameter selection to the data file, queuing the data file in a queue for transmission to the remote storage facility at the transfer time, and transferring the data file to the remote storage facility at the transfer time.

The method according to a further exemplary embodiment may include the parameter selection having at least one of administrative parameters, indexing information, a compression level, an encryption level, and/or a security level.

The method according to a further exemplary embodiment may include the indexing information adding metatag data to the data file to create a searchable data file.

The method according to a further exemplary embodiment may include the selection further including dragging and dropping of the data file to an icon on the GUI.

The method according to a further exemplary embodiment may include the step of transferring the data file further including identifying a service level agreement (SLA), and determining whether to transfer the data file based on enforcing the SLA.

The method according to a further exemplary embodiment may include the SLA indicating a maximum size of data storeable at the remote storage facility.

The method according to a further exemplary embodiment may include the step of transferring the data file further including encrypting the data file according to at least one of the encryption level and/or the security level.

The method according to a further exemplary embodiment may include the step of transferring the data file further including compressing the data file according to the compression level, wherein the compression may include at least one of MPEG, JPEG, TIFF, and/or PDF.

The method according to a further exemplary embodiment may include the step of transferring the data file further including initiating a connection over a network.

The method according to a further exemplary embodiment may include receiving a request at the remote storage facility to retrieve the data file, initiating an authentication sequence between the client and the remote storage facility, and transferring the data file from the remote storage facility to the client.

The method according to a further exemplary embodiment may include receiving a search request at the remote storage facility, initiating a user authentication sequence, providing a browser command to the client, receiving search terms from the client, and generating a results list of one or more data files corresponding to the search terms.

The method according to a further exemplary embodiment may include providing the results list of one or more data files to the client.

The method according to a further exemplary embodiment may include the results list of one or more data files being generated in response to the user entering at least one of a date, a word, a letter sequence, a number sequence, and/or a letter and number sequence at the client.

The method according to a further exemplary embodiment may include charging a fee per one or more accesses of the data file stored at the remote storage facility.

The method according to a further exemplary embodiment may include charging a fee for storing the data file at the remote storage facility.

The method according to a further exemplary embodiment may include the fee being a periodic fee or an aperiodic fee.

The method according to a further exemplary embodiment may include at least one of charging the user the fee, and/or charging a network service provider the fee.

The method according to a further exemplary embodiment may include receiving a request at the remote storage facility, initiating an authentication sequence, and authenticating the user.

The method according to a further exemplary embodiment may include the step of initiating a user authentication sequence further including receiving an identification code from the user, and comparing the identification code with a stored identification code.

A system according to an exemplary embodiment of the invention may include a network, a remote storage facility coupled to the network, a client coupled to the network, the client being adapted to receive a store command for a data file, to prompt a user for a file name for the data file, and to receive a parameter selection that may include a transfer time, the client being adapted to apply the parameter selection to the data file, to queue the data file in a queue for transmission to the remote storage facility, and to transfer the data file to the remote storage facility at the transfer time.

The system according to a further exemplary embodiment may include the parameter selection further including at least one of indexing information, a compression level, and/or a security level.

A computer accessible media according to an exemplary embodiment of the invention may include a GUI application adapted to enable a client to receive a user selected store as request to queue and store a data file at a remote storage facility at a user selectable transfer time.

The computer accessible media according to a further exemplary embodiment may include the GUI being further adapted to enable the client to access the data file from the remote storage facility.

Moreover, the above features and advantages of the invention are illustrative, and not exhaustive, of those which can be achieved by the invention. Thus, these and other features and advantages of the invention will be apparent from the description herein, both as embodied herein and as modified in view of any variations which will be apparent to those skilled in the art.

BRIEF DESCRIPTION OF THE DRAWINGS

The foregoing and other features and advantages of the invention will be apparent from the following, more particular description of the exemplary embodiments of the invention, as illustrated in the accompanying drawings. The left most digits in the corresponding reference number indicate the drawing in which an element first appears.

Exemplary embodiments of the invention are explained in greater detail by way of the drawings, where the same reference numerals refer to the same features.

DETAILED DESCRIPTION OF VARIOUS EXEMPLARY EMBODIMENTS OF THE INVENTION

Exemplary embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

An exemplary embodiment of the present invention generally relates to a method and system for storing a data file at a remote storage facility. The method and system may be particularly useful for storage of imaged documents, data files, and the like. At a client, a user selection of a "store as" command may be received at a graphical user interface (GUI) application program from a user selecting a data file for transfer across a network for storage at a remote storage facility. After the data file is selected, the GUI may prompt the user to enter a file name for the data file. The client may receive a parameter selection at the GUI selecting, for example, but not limited to, indexing information, a compression level, a security level and/or a transfer time, etc., and may apply the parameter selection to the data file. The data file may then be placed in a queue for later transmission to the remote storage facility. The client may at a later time initiate a connection across a network with the remote storage facility and may transfer the data file from the queue to the remote storage facility at the transfer time.

Figure 1:
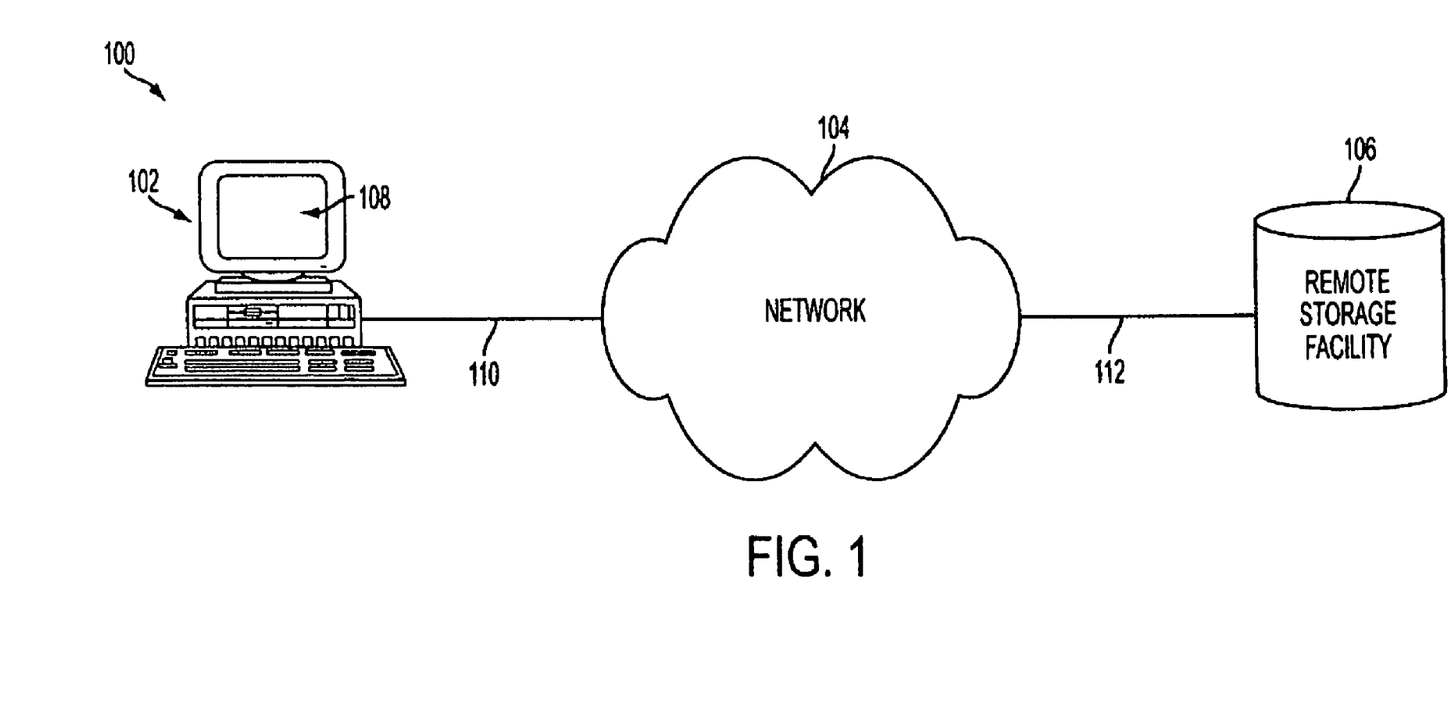
FIG. 1 illustrates an exemplary embodiment of a system according to the present invention.

The invention is initially discussed with reference to FIG. 1. FIG. 1 illustrates an exemplary embodiment of a system according to the present invention. FIG. 1 depicts a system 100 including, e.g., but not limited to, a client 102, a network 104, and a remote storage facility 106. Client 102 may be capable of executing one or more application programs 108 which may be implemented in hardware, firmware, and/or software. The system 100 and application programs 108 may be used to implement a "store as" function, according to an exemplary embodiment of the present invention, where a backup copy of a data file of the client 102 may be stored remotely at the remote storage facility 106 via a queued transfer. The client 102 may be any device capable of manipulating or storing a data file. The client 102 may be a personal computer, as depicted, or may also be, e.g., but not limited to, an electronic device, a notebook, a laptop computer, a handheld, a cellular phone, a browser based cellular phone useable with a broadband connection, a mobile phone, a personal digital assistant (PDA), a browser based PDA useable with a broadband connection, a communications device, a 3G (or 3.25G, 3.5G, 3.75G, 4G, etc.) mobile phone, or other known computing devices that may store and transfer data files. The data file may be any file containing digital data or computer software, such as, e.g., but not limited to, a word processing document, a computer program, an algorithm, a scanned document, an image, audio and/or video data, or other known types of programs and/or data.

The client 102 may be coupled to the network 104 via a connection 110. The connection 110 may be a wired and/or wireless connection to the network 104. The network 104 may be, e.g., but not limited to, a computer network, such as the Internet, a local area network (LAN), a wide area network (WAN), a wireless LAN (WLAN), a fiber optic network, a wireless WAN, a Cellular Digital Packet Data (CDPD) network, a Wi-Fi network, a WiMax network, a wired data network, a wireless data network, or other known data networks. The client 102 may connect to the network 104 through, e.g., but not limited to, a LAN, an internet service provider, a broadband connection, or other known methods of connecting to a computer network. It is noted that the above description is a simple description of a computer network. The details of computer networks are well known in the art, and are not included herein to prevent obscuring the invention.

The remote storage facility 106 may be coupled to the network 104 through a connection 112. The connection 112 may be a wired and/or wireless connection to the network 104. The client 102, the connection 110, the network 104, the connection 112, and the remote storage facility 106 may permit the transfer of data files between the client 102 and the remote storage facility 106. In an exemplary embodiment, the data files may be queued for later transfer.

The remote storage facility 106 may store the data files and permit the client 102 access to the data files when desired by the user. The remote storage facility 106 may include one or more servers at one or more locations as well as other equipment such as, e.g., but not limited to, communications and/or storage devices. The remote storage facility 106 may also store multiple copies of the data files on multiple servers at multiple locations. The exemplary embodiment of the present invention may allow a user to backup important data files at the remote storage facility 106 for later access. Storing the data files may also allow a user to retrieve backup copies of data files if anything should happen to the client 102 or the local copy of the data file stored at the client 102. For the remote storage service, in an exemplary embodiment, the user may pay a fee, such as a periodic fee or a per one or more accesses fee, for storing to and/or accessing data from the remote storage facility 106. Alternatively, a company may purchase or contract to use the remote storage facility (RSF) 106 for use by the employees of the company to backup important data files. In a further alternative embodiment, the fee may be charged to a network service provider. The RSF 106 in an exemplary embodiment may include, e.g., but not limited to, a secure storage facility including physical and information security, may include any of a number of well-known conventional technologies including, raised floor, rack mounted, redundant, RAID or mirrored, fault tolerant, mass storage system, which may include, e.g., but not limited to, webservers, application servers, database servers, traffic balancing technologies, archival technologies, public/private key encryption, security and cryptography devices, authentication services, and search engine servers, etc.

Figure 2:
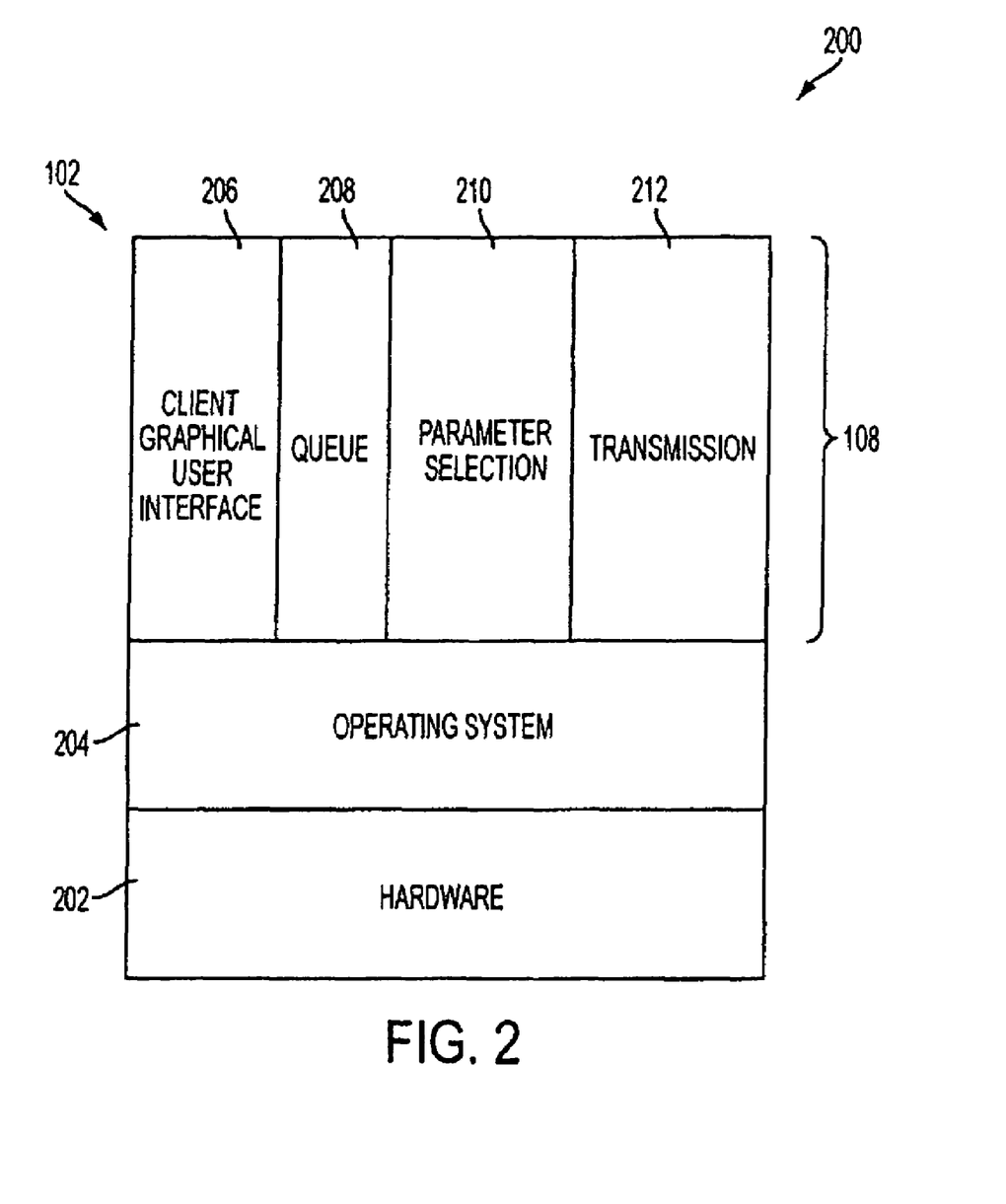
FIG. 2 illustrates an exemplary embodiment for a high level architecture of a client according to the present invention.

FIG. 2 illustrates an exemplary embodiment of a high level architecture 200 of an exemplary client 102 according to the present invention. The architecture of the client 102 may include hardware (HW) 202, an operating system (OS) 204, and application programs 108, which, in an exemplary embodiment may be various software applications. The software applications may include, in an exemplary embodiment, a graphical user interface (GUI) application 206, a queue application 208, a parameter selection application 210, and/or a transmission application 212. Alternatively, these software application programs 108 may be embodied as a single software application program and/or integrated into the OS 204, and/or the HW 202. These software application programs 108 and the operations involved with storing and opening files from the remote storage facility 106, according to an exemplary embodiment, are described below.

Figure 3:
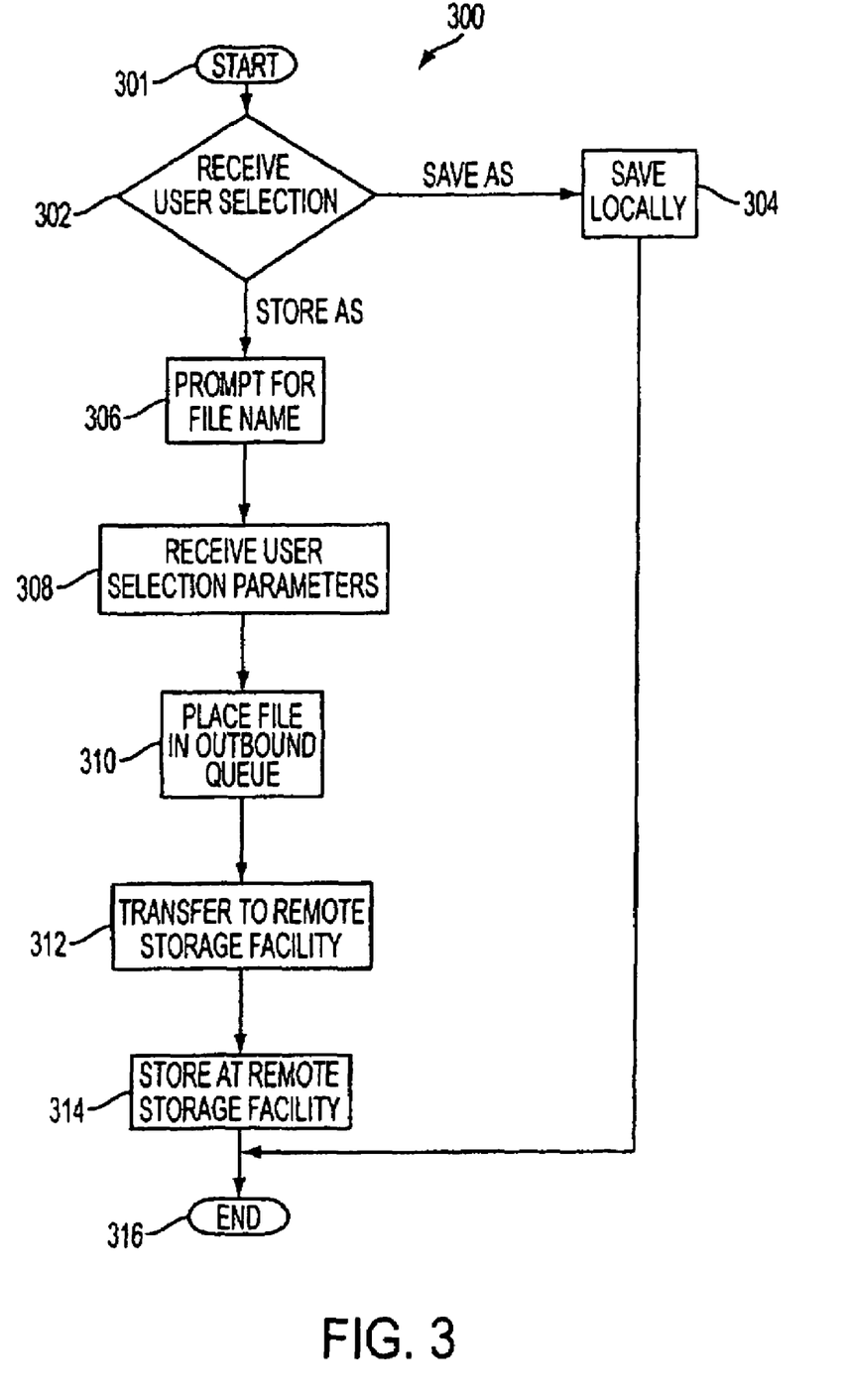
FIG. 3 illustrates an exemplary embodiment of a flow diagram illustrating an exemplary method for transferring a data file from a client to a remote storage facility for storage according to the present invention.

FIG. 3 illustrates an exemplary embodiment of a flow diagram 300 depicting an exemplary method for transferring a data file from the client 102 for storage at a RSF 106 according to the present invention. Flow diagram 300 may begin with 301 and may continue immediately with 302.

In 302, a user may enter, and client 102 may receive, a user selection identifying whether to save a data file locally on the client 102 by performing a "save as" command which may cause flow diagram to proceed with 304, or to store the file remotely at the remote storage terminal 106 by performing a "store as" command, which may cause flow diagram 300 to continue with 306. The user selection may be entered using an input device such as, e.g., but not limited to, a mouse 516, keyboard 518, or the like, at a GUI presented to the user by the GUI application 206 at an output device such as, e.g., but not limited to, a display 530 of the client 102 (the input and output devices are described further below with reference to FIG. 5). The GUI may have a drop down menu to initiate a "save as" function or a "store as" function, and/or the GUI may have an icon where the user may drag and/or drop a data file to the icon to initiate the "save as" function or the "store as" function.

In 304, if the user has selected a "save as" command, the data file may be saved locally on a storage device 510 such as, e.g., but not limited to, a hard disk of the client 102. From 304, flow diagram 300 may continue to 316 and end.

In 306, if the user has selected a "store as" command, the GUI may prompt the user to enter a file name for the data file. Alternatively, the GUI application 206 may retrieve a previously stored file name. Once received, the file name may be associated with the data file so that the user may identify the data file. Optionally, the client may also perform a "save as" function of the data file when the "store as" function is selected. Performing both a "save as" function and a "store as" function may be used to synchronize the saved and stored files so that they may contain the same data. From 306, flow diagram 300 may continue with 308.

In 308, the GUI may prompt the user to select any of various parameter selections and may receive the user parameter selections. Alternatively, the user may have a preset parameter selection such as, e.g., but not limited to, default and/or previously user selected administrative parameters that may be used for each data file.

The parameter selection may be one or more of, e.g., but not limited to, administrative parameters, index information, a compression level, a security level, and/or a transfer time.

In an exemplary embodiment, a user may set certain administrative parameters such as, e.g., but not limited to, a retention limit including, e.g., but not limited to, retain for a period of time, indefinitely, etc. Any of various well-known document retention and destruction options may be available including, e.g., overwrite/destruction.

Index information may be used to index the data file and may be used, e.g., for search purposes when a user may desire to retrieve the file from the remote storage facility 106. Index information may include e.g., but not limited to, metatag data information, document management profile information, versioning, tags, etc. The metatag data may be added to the data file to make the file a searchable data file to facilitate searching when retrieving the data file from the remote storage facility 106. Alternatively, if metatag data is not added, the data file may be a searchable data file based on words within the data file.

The compression level may indicate a level of compression that the user may desire to apply to the data file. A user may select any of various well-known levels of compression, such as, e.g., but not limited to, motion picture experts group (MPEG), Joint Photographic Experts Group (JPEG), tagged image file (TIF), portable document format (PDF), and/or any other audio, video and/or data format compression, or any other compression technique that is available to reduce the size of the data file for transmission and storage.

The security level may include, e.g., but not limited, 128 bit (or other) encryption, and/or public/private key (PKI) encryption, hash codes, authentication, verification, personal identification number (PIN) and/or password-enabled encryption, etc. The security level may be used to, e.g., but not limited to, select the amount of encryption which may be applied to the data file. The security level may, e.g., set a password for the data file and may be used in authenticating anyone who may attempt to access the data file.

The transfer time may be a user-selectable time for when the data file may be transferred from the client 102 to the remote storage facility 106 across the network 104. The system may also have a set transfer time, such as, e.g., on a periodic or aperiodic basic, at a low communication services toll time, at a low network traffic utilization time, etc. Further, the user may, e.g., provide a relative priority to various files, or to set up an automated periodic store as function. For example, a user may select the transfer time to be at 3:00 a.m. Eastern, since less people are typically using the network 104 in the USA at this time.

Once the client 102 has received in 308 the parameter selection, the parameter selection software application 210 may associate the parameter selection with the data file, as well as, e.g., process the data file according to the parameter selection entered by the user. From 308, flow diagram 300 may continue with 310.

In 310, the queue software application 208 may place the data file in an outbound queue according to the parameter selection thereby queuing the data file for transmission across the network 104 to the remote storage facility 106. The queue software application 208 may monitor a computer or network clock and may, e.g., but not limited to, not transmit the data file from the queue until the selected transfer time.

At the transfer time, the transmission software application program 212 may identify a service level agreement and may verify that the client 102 may send the data file. The service level agreement (SLA) may include, e.g., but not limited to, an agreement that may indicate the amount of bandwidth available to the user, the number of data files a user may be allowed to transfer to the remote storage facility 106, the maximum size and/or amount of storage available to a user for storing data files, the amount of storage available and/or used by the user, and/or other data transmission or storage agreements, as will be appreciated by those skilled in the art. The SLA may permit transfer and/or storage of the data file, or may prevent the transfer if transferring the data file would violate the SLA. If the data file is transferable according to the SLA, then diagram 300 may continue with 312.

In 312, the transmission software application 212 of the client 102 may initiate a connection with the remote storage facility 106 across the network 104 at the transfer time. Alternatively, the connection may already be setup and the transfer for may commence according to the parameter selection of 308. Once the connection is setup, the transmission software application 212 may transfer the data file from the queue to the network 104 for transport to the remote storage facility 106. From 312, flow diagram 300 may continue with 314.

In 314, the remote storage facility 106 may receive and store the data file. During storage and/or otherwise, the remote storage facility 106 may process the indexing information of the data file for indexing. The remote storage facility 106 may process the metatag data of the indexing information captured in parameter selection in 308 that may be added to the data file and may permit easy retrieval by the user. Once the indexing information of the data file is processed, the remote storage facility 106 may store the data file according to the indexing information, retention parameters, and other parameter selections. After the data file is indexed and stored, the remote storage facility 106 may safeguard the data file and may wait for a user to send a request to retrieve the data file as discussed further below with reference to FIG. 4. The remote storage facility 106 may also include antivirus and virus scanning capabilities that may scan the data file before and during storage. From 314, flow diagram 300 may continue with 316, and may immediately end.

Figure 4:
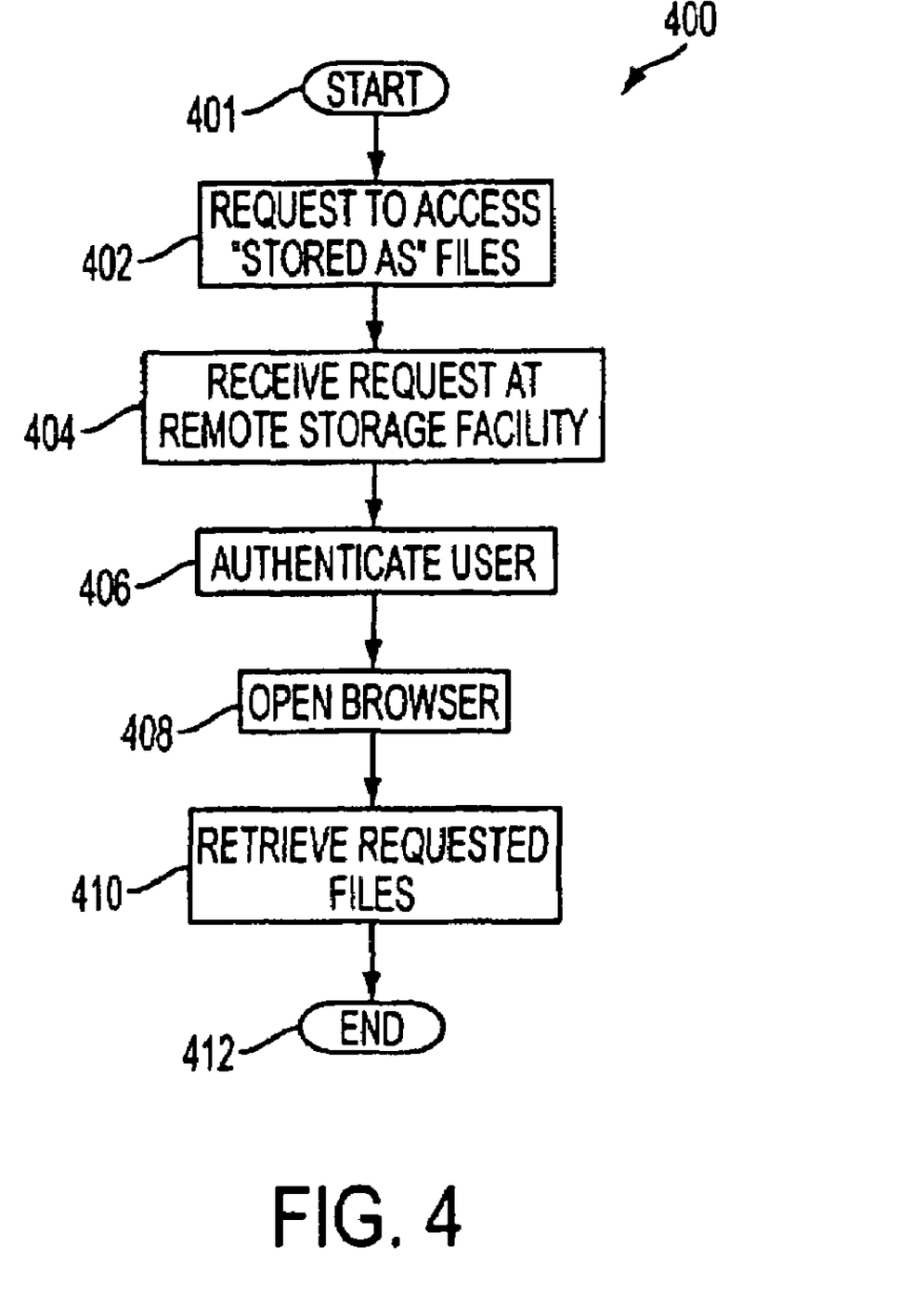
FIG. 4 illustrates an exemplary embodiment of a flow diagram depicting an exemplary method of retrieving a data file from the remote storage facility according to the present invention.

FIG. 4 illustrates an exemplary embodiment of a flow diagram 400 which depicts an exemplary method of retrieving a data file from the remote storage facility 106 according to the present invention. A user may interface with the GUI presented by the GUI software application 206 of the client 102 to request access to the remote storage facility 106 according to an exemplary embodiment.

Flow diagram 400 may begin with 401 and may continue immediately with 402. When a user desires access to a data filed stored at the remote storage facility 106, the user may interact with the GUI of the client 102 to generate a request to access a "stored as" file. In 402, the user interacts with the GUI application 206 to generate a request to access the remote storage facility 106, and the transmission software application 212 of the client 102 may generate a connection with the remote storage facility 106 across the network 104, if not already connected. The request may identify a specific data file, and/or may instead be a search request to browse data files stored at the remote storage facility 106. From 402, flow diagram 400 may continue with 404.

In 404, the remote storage facility 106 may receive and process the request from the client 102. According to an exemplary embodiment, the user may select any of various parameter selections for how the user wishes to access the stored data file, such as, e.g., but not limited to, parameter selections as discussed above with reference to 308 in FIG. 3. From 404, diagram 400 may continue with 406.

In 406, the remote storage facility 106 may initiate an authentication sequence to authenticate the identity of the client 102 and the user. Alternatively, the request generated by the client 102 may include information to authenticate the client 102 and the user. The authentication sequence may include, requiring the user to enter an identification code, and/or other information that may uniquely identify the user. The authentication may occur where the identification code entered by the user may be compared with a previously stored identification code. From 406, flow diagram 400 may continue with 408.

In 408, once the user has been authenticated, the remote storage facility 106 may, e.g., but not limited to, send a browser command and browser data to launch a browser application at the client 102. Alternatively, the browser application may be launched when the user generates the request. The browser data may include the data file specified in the request and/or may include information to display in the browser application at the display 530 of the client 102 to allow the user to search the data files stored by the user at the remote storage facility 106. For example, in an exemplary embodiment, the browser may display a number of computer file folders having data files previously stored by the user at the remote storage facility 106.

The browser at the client 102 may also accept search terms or may display an indexed list of files corresponding to the indexing information specified by the user in 308 during the "store as" command described above with reference to FIG. 3. A user may enter one or more search terms at the browser including, e.g., but not limited to, a date, a word, a letter sequence, a number sequence, or a letter and number sequence for searching through the data files associated with the user stored at the remote storage facility 106. Any of various well known search methods employed by search engines, may be utilized, including, e.g., but not limited to, structured query language (SQL), Boolean search, natural language, etc. The remote storage facility 106 may then receive the search terms and generate a results list of data files that may correspond to the search terms. The results list, in an exemplary embodiment, may be ranked based on the relationship of the data file with the entered search terms using well known methods conventionally employed by search engines and the like. Once generated, the RSF 106 may provide the results list to the client 102 for presentation in the browser.

The browser may also allow the user to perform certain administrative functions. Administrative functions may include, e.g., but not limited to, deleting files stored at the remote storage facility 106, changing the indexing information of the data files, changing the security or encryption level, adding a password to a data file, etc. If the user may desire to access one or more of the data files, the user may indicate requested files in the browser. From 408, flow diagram 400 may continue with 410.

In 410, once one or more data files have been identified and requested, the remote storage facility 106 may retrieve and may transfer the data files to the client 102. Alternatively, the browser may prompt the user to enter a password if a data file is password protected. The transfer of the data file may occur immediately upon receipt of the request, or may occur at a later transfer time, which may be specified by the user and/or according to an SLA. Upon receipt at the client 102, the user may have the option of locally saving the retrieved data file under a new name or at a new location on the client 102, or of replacing the previous version of the data file, which may be damaged or may have missing data, saved locally on the client 102 with the stored as data file received from the remote storage facility 106. Alternatively, the client 102 may compare the received stored as data file and the locally saved data file and only replace the missing and/or damaged portion of the locally saved data file with data from the retrieved data file. From 410, flow diagram 400 may continue with 412 where it may immediately end. Thus, the system 100 as discussed in the above exemplary embodiments may permit a user to save data locally as well as, or alternatively, storing remotely at a remote storage facility 106 thereby providing the user of the client 102 with the ability to protect data files from loss due to problems with the client 102. Advantageously, the system according to the present invention may in another exemplary embodiment be used for transfer of data from one computer of a user to another computer of the user, for example in the case of system upgrades or replacements.

An Exemplary Computer System

Figure 5:
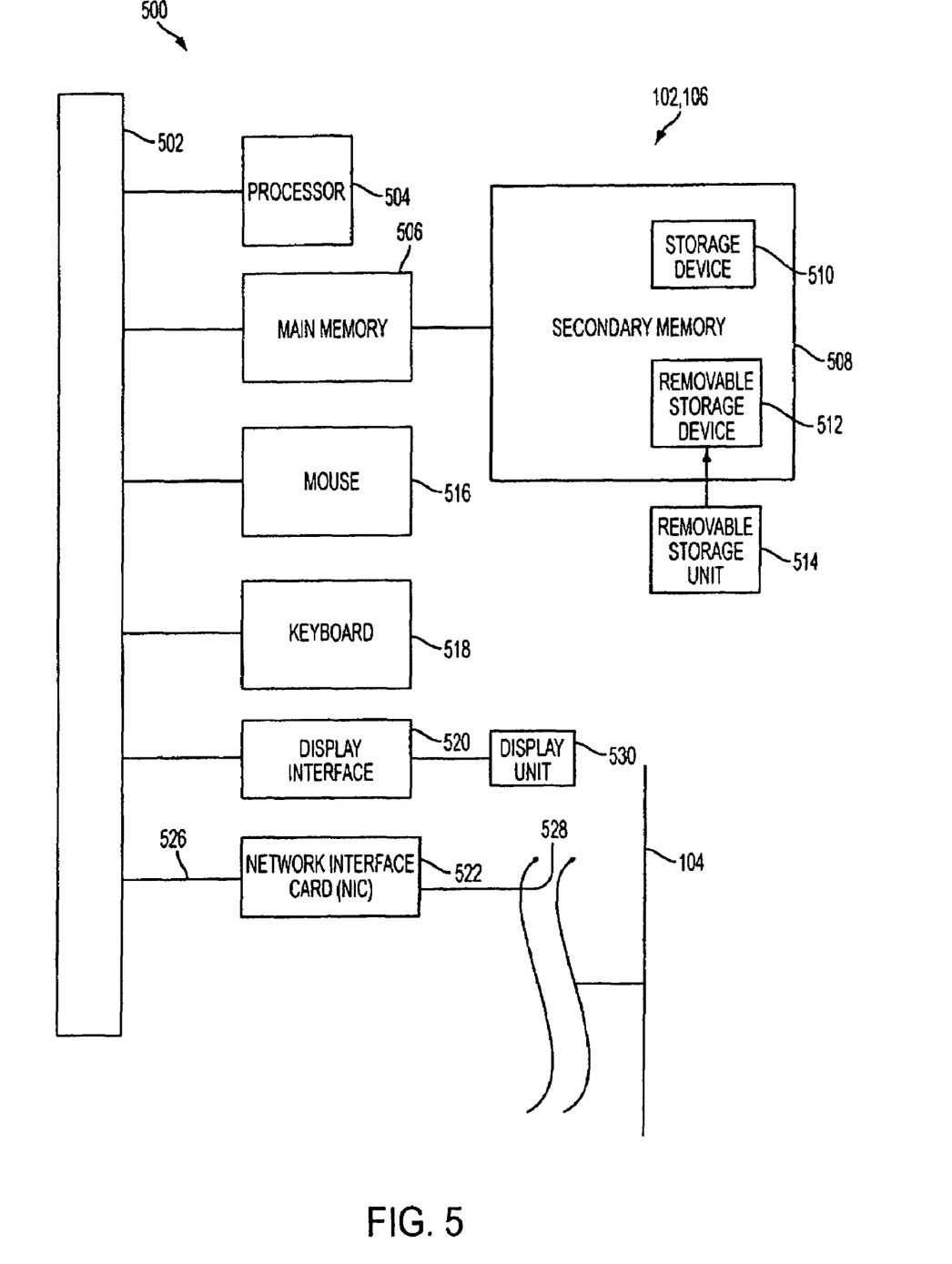
FIG. 5 depicts an exemplary embodiment of a computer system that may be used in computing devices such as, e.g., but not limited to, the client or the remote storage facility according to the present invention.

FIG. 5 depicts an exemplary embodiment of a computer system that may be used in computing and/or communications devices such as, e.g., but not limited to, the client 102 or the remote storage facility 106 according to the present invention. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system 204 such as, e.g., (but not limited to) WINDOWS MOBILE™ for POCKET PC, or MICROSOFT® WINDOWS® NT/98/2000/XP/CE, etc., available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc.

However, the invention may not be limited to these platforms. Instead, the invention may be implemented on any appropriate computer or communications system running any appropriate operating system 204. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 5.

The computer system 500 may include one or more processors, such as, e.g., but not limited to, processor(s) 504. The processor(s) 504 may be connected to a communication infrastructure 502 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include any of a number of output devices including, but not limited to, a display interface 520 that may forward, e.g., but not limited to, graphics, text, and other data, etc., from the communication infrastructure 502 (or from a frame buffer, etc., not shown) for display on a display unit 530. Other output devices such as, e.g., printers, etc., may also be used.

The computer system 500 may also include, e.g., but may not be limited to, a main memory 506, random access memory (RAM), and a secondary memory 508, etc. The secondary memory 508 may include, for example, (but not limited to) a storage device 510 (which may include a read only memory (ROM), a hard disk, a flash memory or other non-volatile memory, a redundant array of inexpensive disks (RAID), a storage area network (SAN), a direct access storage device (DASD), and/or small computer system interface (SCSI) or other storage subsystem controller-controlled storage device) and/or a removable storage device 512, representing, e.g., but not limited to, a floppy diskette drive, a magnetic tape drive, an optical disk drive, a magneto-optical (MO) drive, a compact disk CD-ROM drive, a digital versatile disk drive (DVD), a USB storage device, etc. The removable storage drive 512 may, e.g., but not limited to, read from and/or write to a removable storage unit 514 in a well known manner. Removable storage unit 514, also called a program storage device or a computer program product, may represent, e.g., but not limited to, a floppy disk, magnetic tape, optical disk, CD, DVD, a program cartridge (such as, e.g., but not limited to, those found in video game devices), a removable memory chip (such as, e.g., but not limited to, an erasable programmable read only memory (EPROM), or programmable read only memory (PROM) etc., which may be read from and written to by removable storage drive 512. As will be appreciated, the removable storage unit 514 may include a computer usable storage medium having stored therein computer software and/or data. In alternative exemplary embodiments, secondary memory 508 may include other similar devices for allowing computer programs or other instructions to be loaded into computer system 500.

Computer 500 may also include an input device such as, e.g., (but not limited to) a mouse 516 or other pointing device such as a digitizer, a touch screen type display 530, and a keyboard 518 or other data entry device (none of which are labeled).

Computer 500 may include input/output (I/O) devices such as, e.g., (but not limited to) a network communications interface (NIC) card 522, coupler cable or interface 526 and communications path 528, etc. These devices may include, e.g., but not limited to, a network interface card, and modems (neither are labeled). The network communications interface card 522 may allow software and data to be transferred between computer system 500 and external devices. Examples of the network communications interface card 522 may include, e.g., but may not be limited to, a modem, a network interface (such as, e.g., an Ethernet card), a communications port, a Personal Computer Memory Card International Association (PCMCIA) or PC card slot and card, etc. Software and data transferred via the network communications interface card 522 may be in the form of signals which may be electronic, electromagnetic, optical or other signals capable of being received by the network communications interface card 522. These signals may be provided to the network communications interface card 522 via, e.g., but not limited to, a communications path (e.g., but not limited to, a channel) and onto, e.g., but not limited to, network 104, and other devices including, e.g., but not limited to remote storage facility 106. This communications path may carry signals, which may include, e.g., but are not limited to, propagated signals, and may be implemented using, e.g., but not limited to, wire or cable, fiber optics, a telephone line, a cellular link, an radio frequency (RF) link and other communications channels, etc.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing information in a form readable by a machine (e.g., a computer). For example, a machine-readable medium may include read only memory (ROM); random access memory (RAM); magnetic disk storage media; optical storage media; flash memory devices; and others.

Computer programs 108 (also called computer control logic), may include object oriented computer programs, and may be stored in main memory 506 and/or the secondary memory 508 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 512, hard drive 510 or the network communications interface card 522, etc. The control logic (software), when executed by the processor 504, may cause the processor 504 to perform the functions of the invention as described herein. The computer software may run as a standalone software application program 108 running atop an operating system 204, or may be integrated into the operating system 204.

In yet another embodiment, the invention may be implemented primarily in hardware using, for example, but not limited to, hardware components such as application specific integrated circuits (ASICs), field programmable gateways (FPGAs) or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

The embodiments and examples discussed herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

I claim:

1. A method comprising:

receiving by at least one computer, at a client device of a first entity, a selection by a user of a store as command at a graphical user interface (GUI) executing on said client device, the first entity being at least one of an individual, the user, or a company;

receiving by the at least one computer a selection of a data file on said client device by the user for transfer across a network for storage at a remote storage facility of a second entity, the user having an associated login account with the second entity, the second entity being at least one of a network service provider or an internet service provider (ISP);

prompting by the at least one computer the user for a file name for said data file at said GUI;

associating by the at least one computer said file name with said data file;

receiving by the at least one computer a parameter selection at said GUI, said parameter selection coupled to said account and coupled to a service level agreement (SLA) between the first entity and the second entity, said parameter selection comprising a scheduled transfer time, an encryption selection, and at least one of:

an administrative parameter, wherein said administrative parameter comprises a user selectable remote storage retention duration for said data file and at least one of a default parameter, a previously selected parameter, or a synchronize option;

indexing information;

a compression level; or a security level;

applying by the at least one computer said parameter selection to said data file;

identifying by the at least one computer said SLA;

determining by the at least one computer whether to transfer said data file based on enforcing said SLA;

queuing, if transfer is determined to be permitted, by the at least one computer said data file in a queue for scheduled upload transmission to said remote storage facility of the second entity at said scheduled transfer time; and transferring, if transfer is determined to be permitted, by the at least one computer said data file to said remote storage facility at said transfer time automatically without user interaction based on said parameter selection.

2. The method of claim 1, wherein said indexing information comprises adding metatag data to said data file to create a searchable data file.

3. The method according to claim 1, wherein said selection of at least one of said store as command or said data file comprises dragging and dropping of said data file to an icon on said GUI.

4. The method according to claim 1, wherein said SLA indicates a maximum size of data said first entity is permitted to store at said remote storage facility.

5. The method according to claim 1, wherein said step of transferring said data file further comprises encrypting by the at least one computer said data file according to at least one of said encryption level or said security level.

6. The method according to claim 1, wherein said step of transferring said data file further comprises at least one of compressing by the at least one computer said data file according to said compression level or transferring said data file wherein said data file was previously compressed, wherein said compression comprises at least one of MPEG, JPEG, TIFF, and/or PDF.

7. The method according to claim 1, wherein said step of transferring said data file further comprises initiating by the at least one computer a connection over said network.

8. The method according to claim 1, further comprising:

receiving by the at least one computer a request from the user to retrieve said data file from said remote storage facility;

initiating by the at least one computer an authentication sequence between said client device and said remote storage facility; and receiving by the at least one computer said data file from said remote storage facility to said client device.

9. The method according to claim 1, further comprising:

receiving by the at least one computer a search request from the user for said remote storage facility;

initiating by the at least one computer a user authentication sequence;

providing by the at least one computer a prompt to said user;

receiving by the at least one computer search terms from said user; and receiving by the at least one computer a results list of one or more data files corresponding to said search terms.

10. The method according to claim 9, further comprising providing by the at least one computer said results list of one or more data files to said user.

11. The method according to claim 9, wherein said results list of one or more data files is generated in response to the user entering at least one of a date, a word, a letter sequence, a number sequence, and/or a letter and number sequence at said client device.

12. The method according to claim 1, further comprising by the at least one computer, receiving from the user fee payment information for accessing or storing said data file stored at said remote storage facility.

13. The method according to claim 1, further comprising providing by the at least one computer fee information to the user for at least one of accessing or storing said data file at said remote storage facility.

14. The method according to claim 1, wherein said storage is provided as a service to the user by the second entity in exchange for a fee, wherein said fee comprises a periodic fee or an aperiodic fee.

15. The method according to claim 14, wherein said fee is charged to at least one of the user or a network service provider.

16. The method according to claim 1, further comprising:

providing by the at least one computer a request to said remote storage facility;

initiating by the at least one computer an authentication sequence; and authenticating the user by the at least one computer.

17. The method according to claim 16, wherein said step of initiating an authentication sequence further comprises:

receiving by the at least one computer identification information from the user; and providing by the at least one computer said identification information for comparison with stored identification information.

18. A system comprising:

a storage device at a first entity comprising at least one of a network service provider or an internet service provider (ISP);

a network coupled to said storage device that receives from a client device at a second entity coupled to said network, a data file via a scheduled upload transmission scheduled by a user of the client device through a store as command, the scheduled upload transmission determined to be permitted based on enforcement of an identified service level agreement (SLA) between the first entity and the second entity, the user having an associated login account with the first entity, the second entity comprising at least one of an individual, the user, or a company;

wherein the storage device stores said data file according to a parameter selection coupled to said account and coupled to the SLA ; and wherein said parameter selection comprises a scheduled transfer time, an encryption selection and at least one:
an administrative parameter, wherein said administrative parameter comprises a user selectable remote storage retention duration for said data file and at least one of a default parameter, a previously selected parameter, or a synchronize option;
indexing information;
a compression level; or
a security level.

19. A computer program product (CPP) embodied on a computer readable medium, the CPP comprising:
a GUI application, said GUI comprising:
instructions for enabling at least one computer to receive a user selected store as command to queue a scheduled upload, and automatically transmit, according to a parameter selection coupled to a service level agreement (SLA) between a first entity and a second entity, a data file on said client device to a remote storage facility at the second entity at a user selectable transfer time for storage at the remote storage facility if transmission is determined to be permitted based on identification and enforcement of the SLA, the first entity being at least one of an individual, the user, or a company, and the second entity being at least one of a network service provider or an internet service provider;
instructions for enabling the at least one computer to apply to said data file the parameter selection, the parameter selection comprising a scheduled transfer time, an encryption selection, and at least one of:
an administrative parameter, wherein said administrative parameter comprises a user selectable remote storage retention duration for said data file and at least one of a default parameter, a previously selected parameter, or a synchronize option;
indexing information;
a compression level; or
a security level.

20. The GUI of claim 19, wherein said GUI application is further adapted to comprises instructions for enabling the at least one computer to access said data file from said remote storage facility.

21. A method comprising:
receiving by at least one computer at a storage facility service provider of a first entity, a scheduled upload transmission of a data file, based on a parameter selection, from a remote client device of—a second entity resulting from a store as request from a user, the user having an account associated with the first entity, the scheduled upload transmission determined to be permitted based on enforcement of an identified service level agreement (SLA) between the first entity and the second entity, the storage facility and the remote client device coupled to one another via at least one of: a network service provider or an internet service provider (ISP), the second entity being at least one of an individual, the user, or a company,
wherein said parameter selection is coupled to said account and coupled to the SLA, wherein said parameter selection comprises a scheduled transfer time, an encryption selection and at least one of:
an administrative parameter, wherein said administrative parameter comprises a user selectable remote storage retention duration for said data file and at least one of a default parameter, a previously selected parameter, or a synchronize option;
indexing information;
a compression level; or
a security level; and
storing by the at least one computer said data file on a storage device of said storage facility service provider based on said parameter selection.

22. The method according to claim 21, wherein said receiving comprises:
identifying by the at least one computer said service level agreement (SLA); and
determining by the at least one computer whether to receive said data file based on enforcing said SLA.

23. The method according to claim 21, wherein said SLA indicates a maximum size of data said second entity is permitted to store at said storage facility service provider.

24. The method according to claim 21, wherein said storing further comprises encrypting and storing by the at least one computer said data file according to at least one of said encryption level or said security level.

25. The method according to claim 24, wherein said encrypting comprises at least one of: authentication, password, public/private key (PKI) encryption, hash codes, verification, personal identification number (PIN) or password-enabled encryption.

26. The method according to claim 21 wherein said receiving further comprises at least one of compressing said data file according to said compression level or receiving said data file wherein said data file was previously compressed, wherein said compression comprises at least one of MPEG, JPEG, TIFF, PDF, an audio format compression, a video format compression or a data format compression.

27. The method according to claim 21, further comprising:
receiving by the at least one computer a request at said storage facility service provider to retrieve said data file;
initiating by the at least one computer an authentication sequence between said client device and said storage facility service provider; and
transferring by the at least one computer said data file from said storage facility service provider to said client device.

28. The method according to claim 21, further comprising:
receiving by the at least one computer a search request at said storage facility service provider;
initiating by the at least one computer a user authentication sequence;
providing by the at least one computer a prompt to said client device;
receiving by the at least one computer search terms from said client device; and
generating by the at least one computer a results list of one or more data files corresponding to said search terms.

29. The method according to claim 28, further comprising providing by the at least one computer said results list of one or more data files to said client device.

30. The method according to claim 28, wherein said results list of one or more data files is generated in response to the user entering at least one of a date, a word, a letter sequence, a number sequence, and/or a letter and number sequence at said client device.

31. The method according to claim 21, further comprising receiving from, the remote client device by the at least one computer, fee payment information for accessing or storing said data file stored at said storage facility service provider.

32. The method according to claim 21, further comprising providing by the at least one computer fee information to the user for at least one of accessing or storing said data file at said storage facility service provider.

33. The method according to 21, wherein said storage is provided as a service to the user by the first entity in exchange for a fee, wherein said fee comprises a periodic fee or an aperiodic fee.

34. The method according to 33, wherein said fee is charged to at least one of the user or a network service provider.

35. The method according to claim 21, further comprising:
- receiving by the at least one computer a request at said storage facility service provider;
- initiating by the at least one computer an authentication sequence; and
- authenticating by the at least one computer the user.

36. The method according to claim 35, wherein said step of initiating an authentication sequence further comprises:
- receiving by the at least one computer identification information from the remote client device; and
- comparing by the at least one computer said identification information with stored identification information.

37. The method according to claim 36, wherein identification information comprises at least one of: password, user information, personal identification number (PIN), verification information, or authentication information.

38. A system comprising:
- means for receiving by at least one computer at a storage facility service provider of a first entity, a scheduled upload transmission of a data file, based on a parameter selection, from a remote client device of second entity resulting from a store as request from a user, the user having an account associated with the first entity, the scheduled upload transmission determined to be permitted based on enforcement of an identified service level agreement (SLA) between the first entity and the second entity, the storage facility and the remote client device coupled to one another via at least one of: a network service provider or an internet service provider (ISP), the second entity being at least one of an individual, the user, or a company,
- wherein said parameter selection is coupled to said account and coupled to the SLA, wherein said parameter selection comprises a scheduled transfer time, an encryption selection and at least one of:
  - an administrative parameter, wherein said administrative parameter comprises a user selectable remote storage retention duration for said data file and at least one of a default parameter, a previously selected parameter, or a synchronize option;
  - indexing information;
  - a compression level; or
  - a security level; and
- means for storing by the at least one computer said data file on a storage device of said storage facility service provider based on said parameter selection.

* * * * *